(12) United States Patent
Ball et al.

(10) Patent No.: US 6,572,327 B1
(45) Date of Patent: Jun. 3, 2003

(54) METHOD FOR POSITIONING A CYLINDRICAL ARTICLE

(75) Inventors: Roger Willard Ball, Midland (CA);
Brien Douglas Ross, Wyevale (CA);
Robert J. Scholz, Midland (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/921,878

(22) Filed: Aug. 2, 2001

(51) Int. Cl.⁷ .............................................. B65G 47/14
(52) U.S. Cl. ........................ 414/816; 414/433; 414/757
(58) Field of Search ................................. 198/375, 394; 414/433, 757, 781, 816

(56) References Cited

U.S. PATENT DOCUMENTS

| | | | | |
|---|---|---|---|---|
| 3,480,158 A | * | 11/1969 | Pandjiris et al. | 414/757 |
| 4,466,768 A | * | 8/1984 | Datseris et al. | 414/757 X |
| 5,035,569 A | * | 7/1991 | Alznauer | 414/757 |
| 5,500,641 A | * | 3/1996 | Roberts | 414/757 X |

FOREIGN PATENT DOCUMENTS

SU    1715547    *  2/1992 .................. 414/757

* cited by examiner

*Primary Examiner*—Janice L. Krizek
(74) *Attorney, Agent, or Firm*—William C. Schubert; Glenn H. Lenzen, Jr.

(57) ABSTRACT

A cylindrical article is positioned relative to a support surface by supporting the cylindrical article from a first pair of ball bearings contacting the cylindrical article adjacent to its first end, and a second pair of ball bearings contacting the cylindrical surface adjacent to its second end. At least one of the ball bearings is moved relative to the cylindrical article to reposition the cylindrical article. The repositioning may be performed under feedback control of actuators that move the ball bearings. The article may be fixed relative to the support surface after it is properly positioned.

24 Claims, 3 Drawing Sheets

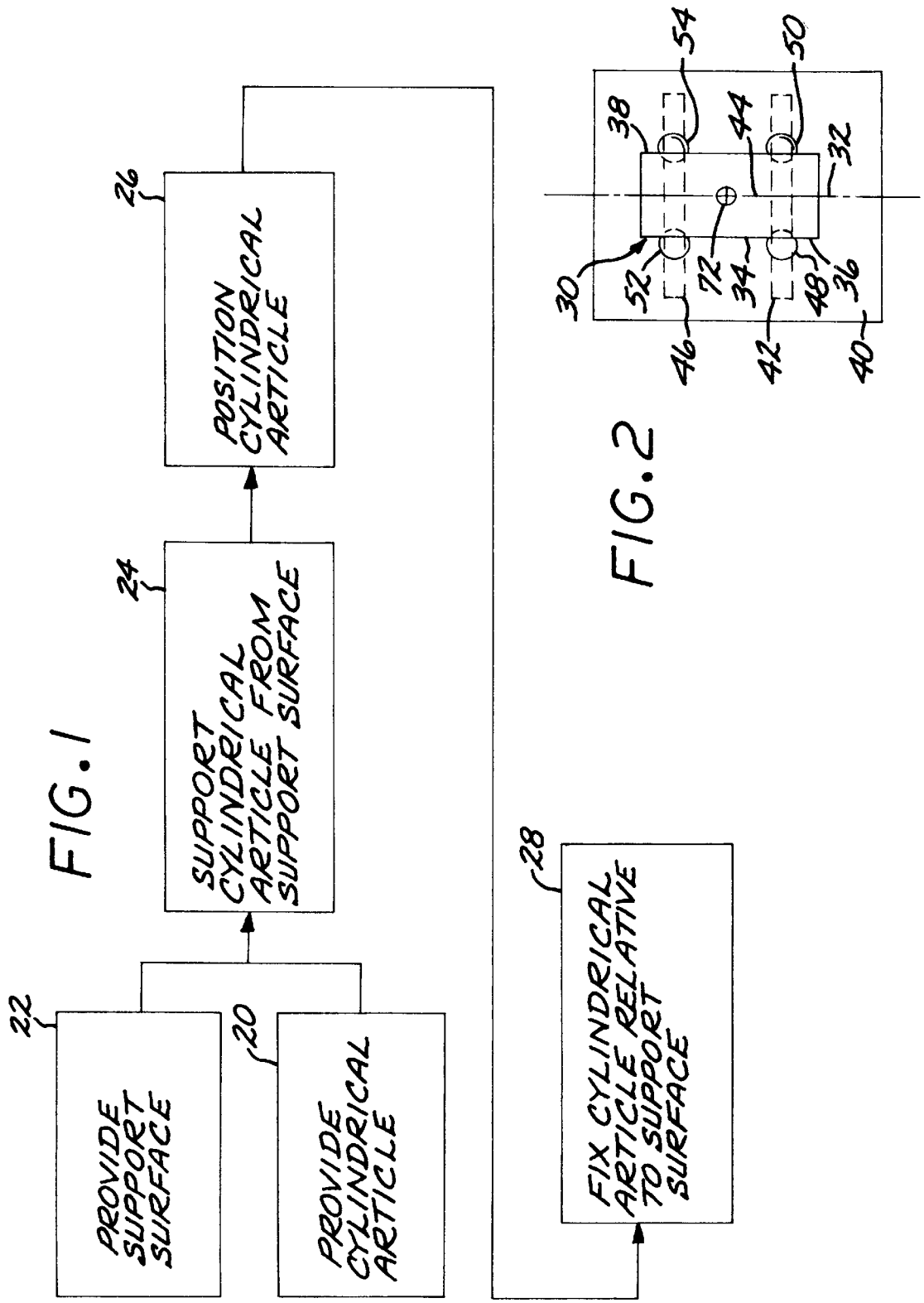

METHOD FOR POSITIONING A CYLINDRICAL ARTICLE

This invention relates to a mechanical positioning technique and, more particularly, to such a technique useful in positioning cylindrical articles, such as optical components, in a production setting.

BACKGROUND OF THE INVENTION

When an optical system involving free-space propagation of light beams is constructed, the optical components must be aligned to a high degree of precision. Any misalignments lead either to a loss of beam energy or to inoperability of the optical system if the misalignment is too large. When there are multiple optical components to be aligned, the beam losses due to misalignment multiply as the beam propagates through each successive optical component.

There are highly sophisticated alignment devices suitable for laboratory or prototype work. These devices allow adjustment in five or six degrees of freedom as required for general alignment. Such devices are costly and are not suitable in many cases for the positioning of production components because portions of the alignment device remain in the production device after the alignment is complete and therefore must be treated as a consumable item.

In the production setting where the cost of consumable portions of the alignment apparatus is a concern, components to be aligned are typically supported from a baseplate on dowel pins or wires and then carefully positioned. Supports such as dowel pins and wires have the shortcomings that they do not permit movement of the optical component in five or six degrees of freedom and in some cases are highly compliant so that they do not retain the aligned position. Thus, these approaches have shortcomings in the production environment.

There is a need for a positioning approach that allows an optical component to be positioned precisely in the production setting. That is, any parts of the alignment apparatus that remain in the aligned optical system must be inexpensive and disposable. The apparatus and approach must permit a high degree of precision in the alignment. The present invention fulfills this need, and further provides related advantages.

SUMMARY OF THE INVENTION

The present invention provides an alignment apparatus and method for positioning a cylindrical article with up to six degrees of freedom. The approach produces a highly precise alignment, both temporarily and permanently. The alignment is achieved with a metal-to-metal contact that is rigid. The portions of the alignment apparatus that remain in the aligned optical system are inexpensive and disposable. The present approach is particularly suitable for the alignment of articles in a production setting. While the approach is specific to cylindrical articles, many otherwise non-cylindrical articles may be placed into a cylindrical housing for alignment by the present approach.

In accordance with the invention, a method for positioning a cylindrical article comprises the steps of providing a support surface, and providing a cylindrical article having a cylindrical axis, a cylindrical surface, a first end of the cylindrical surface, and a second end of the cylindrical surface. The cylindrical article is preferably a component of an optical system such as a collimator. If the article is not initially cylindrical, it may be mounted in a cylindrical housing to permit the practice of the present approach. The cylindrical article is supported from the support surface by a first pair of bearings contacting the support surface and the cylindrical surface adjacent to its first end, with one bearing of the first pair of bearings on either side of a projection of the cylindrical axis onto the support surface, and a second pair of bearings contacting the support surface and the cylindrical surface adjacent to its second end, with one bearing of the second pair of bearings on either side of the projection of the cylindrical axis onto the support surface. The cylindrical article is positioned by moving at least one of the bearings relative to the cylindrical article.

The bearings are preferably ball bearings that provide six degrees of freedom in the movement of the cylindrical article. Other types of bearings may be used where appropriate. For example, roller bearings may be used where motion of the cylindrical article parallel to the cylindrical axis is not required.

Any of an operable combination of three approaches is preferred for constraining the movement of the bearings in the desired paths and in the desired locations. In the first approach a first linear constraint is formed in the support surface, and a second linear constraint is formed in the support surface parallel to the first linear constraint. The first pair of bearings is placed into the first linear constraint, and the second pair of bearings is placed into the second linear constraint. The use of the linear constraints causes the movement of the pairs of bearings to be parallel to each other along the surface of the support surface, and generally perpendicular to the projection of the cylindrical axis onto the support surface. ("Generally perpendicular" means that the relation is either exactly perpendicular or nearly perpendicular to within a few degrees, such as within about 5 degrees.)

In a second approach, the support surface is magnetized, and the four bearings are made of a ferromagnetic material. Equivalently but less conveniently, the four magnetized bearings may be magnetized, and the support surface is ferromagnetic. This use of magnetic force biases the bearings in place, requiring a positive force to move them.

In the third approach, a biasing force is applied to the cylindrical article in a direction perpendicular to and toward the support surface. This biasing force may be applied by any operable approach such as, for example, a mechanical actuator or an applied magnetic field.

The bearings are moved in a coordinated fashion to reposition the cylindrical article in four degrees of freedom. To raise or lower the cylindrical article in a direction perpendicular to the support surface, the bearings of both pairs are moved on the support surface and in a direction generally perpendicular to the projection of the cylindrical axis, so that a spacing between the bearings of each pair changes by the same amount. To change the pitch of the cylindrical article relative to the projection of the cylindrical axis onto the support surface, the bearings of both pairs are moved on the support surface and in a direction generally perpendicular to the projection of the cylindrical axis, so that a spacing between the bearings of each pair changes by a different amount. To move the cylindrical axis parallel to the support surface and perpendicular to the projection of the cylindrical axis onto the support surface, the bearings of both pairs are moved on the support surface and in a direction generally perpendicular to the projection of the cylindrical axis, so that a spacing between the bearings of each pair is unchanged. To change the yaw angle of the cylindrical article, the bearings of one pair are moved on the support surface generally perpendicular to the projection of the cylindrical axis, so that a spacing between the bearings of each pair is unchanged. A fifth degree of freedom is attained by rolling the cylindrical article on the bearings parallel to the cylindrical axis. A sixth degree of freedom is attained by rotating the cylindrical article about the cylindrical axis on the bearings.

The present approach is preferably practiced in an automated fashion. An actuator system moves the bearings. A feedback control system comprises a sensor having as a sensor output an indication of a position of the cylindrical article, and a controller having the sensor output as an input and a command signal to the actuator system as an output.

When the cylindrical article is temporarily positioned to its desired final position, it may be fixed relative to the support surface. The fixation may be accomplished temporarily, as with mechanical clamps or other devices, or permanently, as by potting the structure, including the bearings, with epoxy or other potting material. The bearings, relatively inexpensive articles, remain in the permanently fixed structure and are therefore consumables.

The present approach is readily practiced in a production setting, so that the alignment and permanent fixing of the cylindrical article are accomplished accurately and inexpensively. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block diagram of an approach for practicing the invention;

FIG. 2 is a schematic top view of a cylindrical article supported on a support surface by two pairs of bearings;

DETAILED DESCRIPTION OF THE INVENTION

Figure 3:
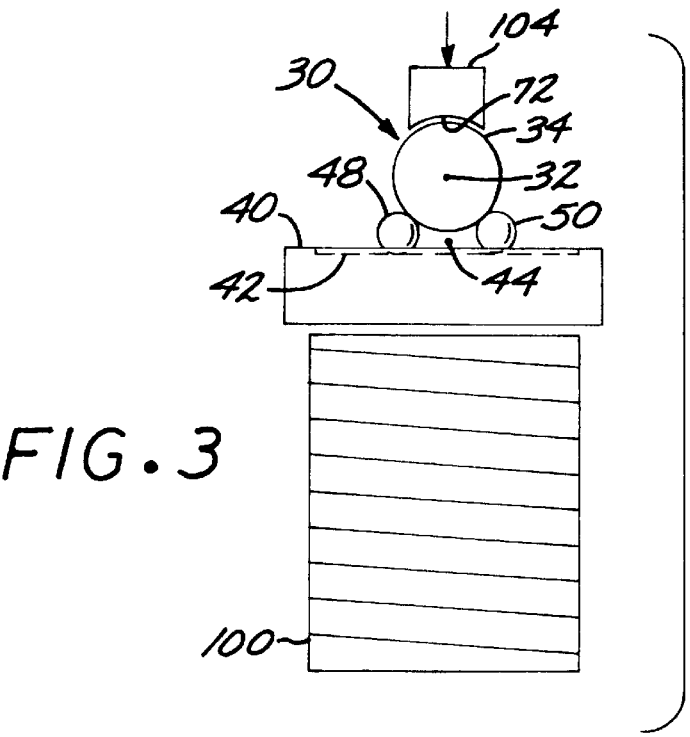
FIG. 3 is a schematic end view of the supported cylindrical article of FIG. 2.
Figure 4:
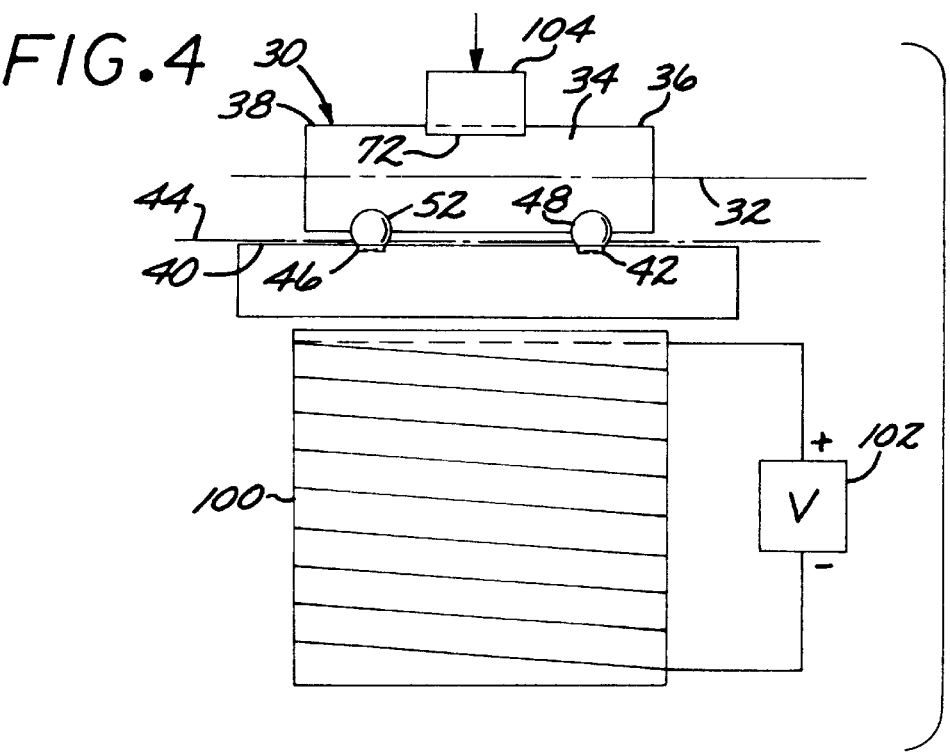
FIG. 4 is a schematic elevational view of the supported cylindrical article of FIG. 2.

FIG. 1 depicts a method for positioning a cylindrical article in block diagram form, and FIGS. 2–4 illustrate the components of the positioning apparatus in relation to the cylindrical article. The method includes providing a cylindrical article, numeral 20. The cylindrical article 30, seen in FIGS. 2–4, has a cylindrical axis 32, a cylindrical surface 34, a first end 36 of the cylindrical surface 34, and a second end 38 of the cylindrical surface 34. The cylindrical article may be of any type, but is a component of an optical system such as an optical collimator in the application presently of most interest. If an article of interest is not initially cylindrical, it may be mounted inside a cylindrical housing to permit it to be aligned by the present approach.

A support surface 40 is provided, numeral 22. The support surface 40 is preferably a flat surface. It may be made of any operable material, but in some embodiments is a material such as a ferromagnetic steel that may be magnetized.

The support surface 40 preferably includes a first linear constraint 42 in the support surface 40. A second linear constraint 46 in the support surface 40 is parallel to the first linear constraint 42.

The linear constraints 42 and 46 are features in or on the support surface 40 that cause an object contacting the linear constraint to move parallel to the linear constraint. The linear constraints 42 and 46 are preferably shallow grooves that allow a ball to roll therein. The linear constraints 42 and 46 may instead be, for example, pairs of ridges on the support surface 40 that serve the same function. The orientation of the linear constraints 42 and 46 causes the object rolling therein to roll generally perpendicular to a projection 44 of the cylindrical axis 32 onto the support surface 40. The projection 44 is defined as the locus of points (which is a line) on the support surface 40 from which lines drawn perpendicular to the plane pass through the cylindrical axis 32.

The cylindrical article 30 is supported from the support surface 40 by bearings, numeral 24. The bearings are preferably ball bearings, but may be other types such as roller bearings. In the preferred approach, a first pair of ball bearings 48 and 50 rolls in the first linear constraint 42. The first pair of ball bearings 48 and 50 contact the cylindrical surface 34 adjacent to its first end 36. One ball bearing of the first pair of ball bearings 48 and 50 is on either side of the projection 44 of the cylindrical axis 32 onto the support surface 40, and thence on either side of the cylindrical article 30.

A second pair of ball bearings 52 and 54 rolls in the second linear constraint 46. The second pair of ball bearings 52 and 54 contact the cylindrical surface 34 adjacent to its second end 38. One ball bearing of the second pair of ball bearings 52 and 54 is on either side of the projection 44 of the cylindrical axis 32 onto the support surface 40.

All of the ball bearings 48, 50, 52, and 54 are preferably of the same size. In one embodiment, they are made of a ferromagnetic material that is attracted to the magnetized support surface 40. This magnetic attraction aids in stabilizing the ball bearings 48, 50, 52, and 54 in the positions to which they are moved. Less preferably, the ball bearings 48, 50, 52, and 54 may be magnetized and the support surface a ferromagnetic material to obtain the same magnetic stabilization. In another embodiment whose components are shown in FIGS. 3–4, an electromagnet 100 driven by a voltage source 102, preferably an adjustable voltage source, is positioned so that its magnetic field lies generally perpendicular to the support surface 40. If the cylindrical article 30 is made of a ferromagnetic material, the magnetic field of the electromagnet 100 biases the cylindrical article 30 to its current position. If the cylindrical article 30 is made of a non-ferromagnetic material, a ferromagnetic slug 104 may be placed contacting the top side of the cylindrical article 30, so that the magnetic field of the electromagnet 100 acts against the slug 104 to bias the cylindrical article 30 to its position. The magnetic stabilization approaches are ordinarily not used together, but any of them may be used in conjunction with the linear constrains 42 and 46. That is, one but not both of the approaches would be used at any time. However applied, the biasing force acts through a biasing location 72 that is perpendicular to the support surface 40.

When the two pairs of ball bearings 48, 50 and 52, 54 are of the same size and are symmetrically oriented and spaced with respect to the cylindrical article 30, they support the cylindrical article 30 so that the cylindrical axis 32 is generally parallel to the support surface 40 and perpendicular to the linear constraints 42 and 46. This orientation provides a reference orientation, but in most cases the cylindrical axis 32 in this reference orientation will not be pointed to the precise location that is desired. Subsequent repositioning of the cylindrical article 30 achieves that precise pointing and positioning.

Figure 5:
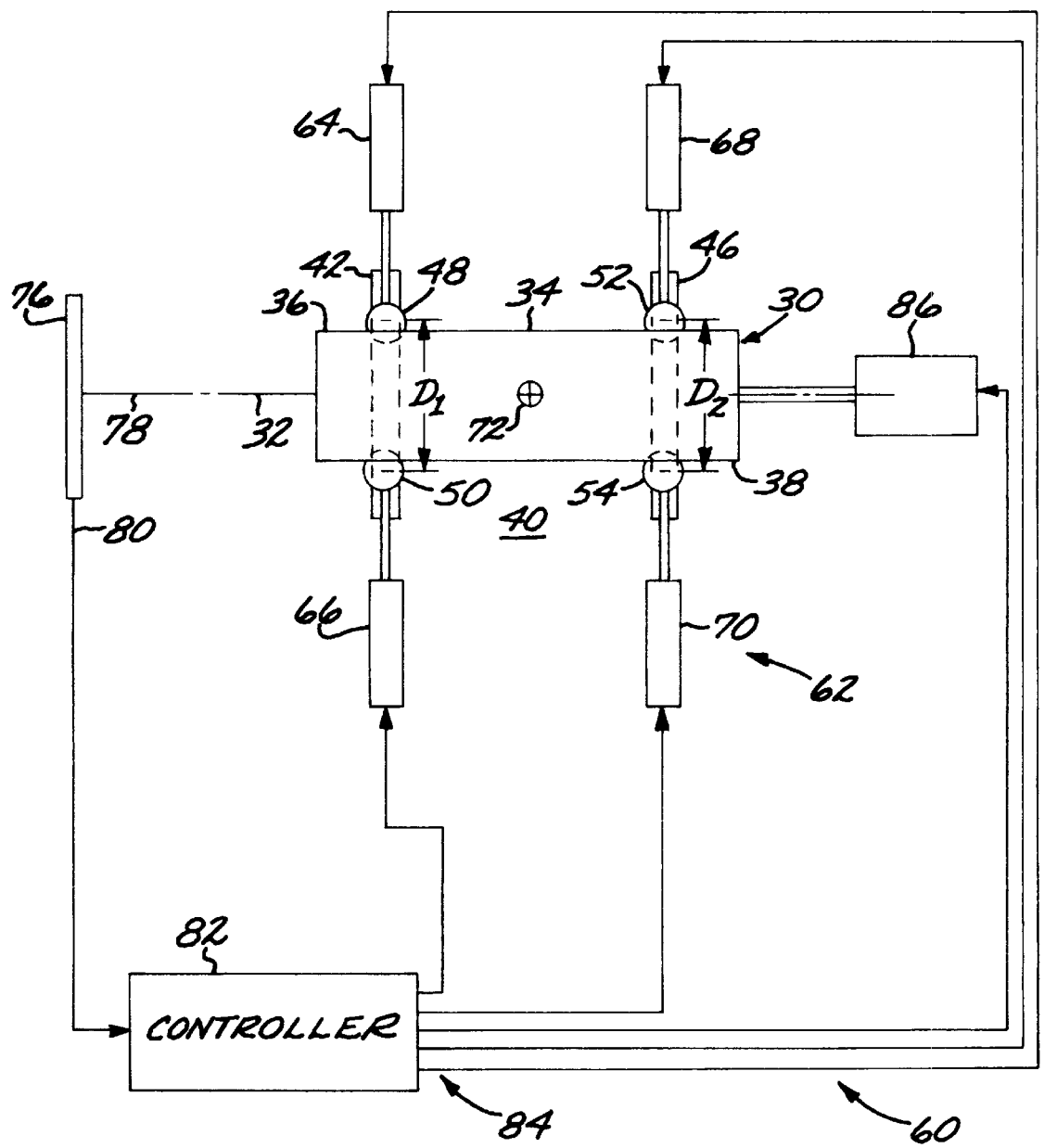
FIG. 5 is a schematic plan view of the cylindrical article supported on the support surface, with a feedback controller for repositioning the cylindrical article.

The cylindrical article is positioned (and repositioned) by moving at least one of the ball bearings 48, 50, 52, and 54 relative to the cylindrical article 30, numeral 26. The positioning may be accomplished under manual control, but is more preferably accomplished using a feedback control and actuation system 60 that is schematically illustrated in FIG. 5.

The feedback control and actuation system 60 includes an actuator system 62 that moves the ball bearings 48, 50, 52, and 54. In this case, there are four linear actuators 64, 66, 68, and 70 that push the respective ball bearings 48, 50, 52, and 54 toward the cylindrical article 30. A biasing force is applied to the cylindrical article 30 in a direction perpendicular to and toward the support surface 40 at the biasing location 72. The actuators 64, 66, 68, and 70 work against this biasing force, which thereby serves as the restoring force for the ball bearings 48, 50, 52, and 54 when the actuators are retracted.

The feedback control and actuation system 60 further includes a feedback control system 74 having a light sensor 76 such as an imaging sensor (e.g., a focal plane array sensor or a quad sensor) that senses the incident location of a light beam 78 projected from the cylindrical article 30 along its cylindrical axis 32. The sensor 76 has as a sensor output 80 an indication of a position of the cylindrical axis 32 and thence of the cylindrical article 30. A controller 82 has the sensor output 80 as an input and a command signal 84 to the actuator system 62 as an output. In the illustration, there are five outputs in the command signal 84, one to each of the four actuators 64, 66, 68, and 70, and a fifth to an optional actuator 86 that moves the cylindrical article 30 parallel to the cylindrical axis 32 and/or rotates the cylindrical article 30 about the cylindrical axis 32.

The actuator system 62 is used to move the ball bearings 48, 50, 52, and 54 responsive to the feedback control system 74 until a desired position of the cylindrical article 30 is achieved. The bearings 48, 50, 52, and 54 are moved in a coordinated fashion to produce repositioning of the cylindrical article 30 in four degrees of freedom. To raise or lower the cylindrical article 30 in a direction perpendicular to the support surface 40, the bearings of both pairs 48, 50 and 52, 54 are moved in their respective linear constraints 42 and 46, so that a spacing between the bearings of each pair (respectively $D_1$ and $D_2$) changes by the same amount but that the bearings remain equally spaced from the cylindrical axis 32. To change the pitch of the cylindrical axis 32 of the cylindrical article 30 relative to the projection 44 of the cylindrical axis 32 onto the support surface 40, the bearings of both pairs are moved in their respective linear constraints 42 and 46 so that a spacing between the bearings of each pair changes by a different amount. To move the cylindrical axis parallel to the support surface and generally perpendicular to the projection 44 of the cylindrical axis 32 onto the support surface 40, the bearings of both pairs are moved equally in their respective linear constraints 42 and 46 so that a spacing between the bearings of each pair is unchanged. To change the yaw angle of the cylindrical article 30, the bearings of one pair are moved in their linear constraint so that a spacing between the bearings of each pair is unchanged. These changes accomplishing individual movements may of course be intermixed to accomplish complex changes in the pointing and direction of the cylindrical axis 32. As these changes are made, the change in position of the light beam 78 is detected by the sensor 76 and sent to the controller 82. The controller 82 commands subsequent movement of the actuators 64, 66, 68, 70, and 86, until the desired final position of the light beam 78 and thence the cylindrical axis 32 and the cylindrical article 30 are achieved. Movement of the cylindrical article 30 parallel to the cylindrical axis 32 or rotation of the cylindrical article 30 about the cylindrical axis 32 are accomplished by the actuator 86.

After the desired final position is reached, that position of the cylindrical article 30 may be fixed permanently or semipermanently relative to the support surface 40, numeral 28. The fixing may be accomplished semipermanently, as with a clamp, or permanently, as with an adhesive such as an epoxy adhesive that is used to affix the cylindrical article 30 and the ball bearings 48, 50, 52, and 54 to the support surface 40. The ball bearings 48, 50, 52, and 54 remain in place, ensuring a metal-to-metal contact between the cylindrical article 30 and the support surface 40 to minimize thermal expansion effects. The ball bearings are therefore disposable parts of the alignment apparatus, but are relatively inexpensive.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for positioning a cylindrical article, comprising the steps of
   providing a support surface;
   providing a cylindrical article having a cylindrical axis, a cylindrical surface, a first end of the cylindrical surface, and a second end of the cylindrical surface;
   supporting the cylindrical article from the support surface by
      a first pair of bearings contacting the support surface and the cylindrical surface adjacent to its first end, with one bearing of the first pair of bearings on either side of a projection of the cylindrical axis onto the support surface, and
      a second pair of bearings contacting the support surface and the cylindrical surface adjacent to its second end, with one bearing of the second pair of bearings on either side of the projection of the cylindrical axis onto the support surface; and
   positioning the cylindrical article by moving at least one of the bearings relative to the cylindrical article, wherein the step of positioning includes the steps of
      providing an actuator system that moves the bearings, and
      providing a feedback control system comprising
         a sensor having as a sensor output an indication of a position of the cylindrical article, and
         a controller having the sensor output as an input and a command signal to the actuator system as an output.

2. The method of claim 1, wherein the step of providing a cylindrical article includes the step of
   providing a component of an optical system as the cylindrical article.

3. The method of claim 1, wherein the step of supporting includes the step of
   furnishing bearings that are ball bearings.

4. The method of claim 1, wherein the step of providing a support surface includes the step of providing a magnetized support surface, and wherein the step of supporting the article includes the step of providing the bearings made of a ferromagnetic material.

5. The method of claim 1, wherein the step of supporting includes the step of providing four magnetized bearings, and wherein the step of providing a support surface includes the step of providing a ferromagnetic support surface.

6. The method of claim 1, wherein the step of supporting includes the step of applying a force generated by an electromagnet to the cylindrical article.

7. The method of claim 1, wherein the step of providing a support surface includes the step of forming a first linear constraint in the support surface, and forming a second linear constraint in the support surface parallel to the first linear constraint, and wherein the step of supporting the cylindrical article includes the step of placing the first pair of bearings into the first linear constraint, and placing the second pair of bearings into the second linear constraint.

8. The method of claim 1, wherein the step of positioning includes the step of moving the bearings of both pairs on the support surface and in a direction generally perpendicular to the projection of the cylindrical axis onto the support surface, so that a spacing between the bearings of each pair changes by the same amount.

9. The method of claim 1, wherein the step of positioning includes the step of moving the bearings of both pairs on the support surface and in a direction generally perpendicular to the projection of the cylindrical axis onto the support surface, so that a spacing between the bearings of each pair changes by a different amount.

10. The method of claim 1, wherein the step of positioning includes the step of moving the bearings of both pairs on the support surface and in a direction generally perpendicular to the projection of the cylindrical axis onto the support surface, so that a spacing between the bearings of each pair is unchanged.

11. The method of claim 1, wherein the step of positioning includes the step of moving the bearings of one pair on the support surface generally perpendicular to the projection of the cylindrical axis onto the support surface, so that a spacing between the bearings of each pair is unchanged.

12. The method of claim 1, wherein the step of positioning includes the step of rotating the cylindrical article about the cylindrical axis on the bearings.

13. The method of claim 1, wherein the step of positioning includes the step of applying a biasing force to the cylindrical article in a direction perpendicular to and toward the support surface.

14. The method of claim 1, including an additional step, after the step of positioning, of fixing the cylindrical article relative to the support surface.

15. A method for positioning a cylindrical article, comprising the steps of providing a cylindrical article having a cylindrical axis, a cylindrical surface, a first end of the cylindrical surface, and a second end of the cylindrical surface;

providing a support surface having a first linear constraint in the support surface, and a second linear constraint in the support surface parallel to the first linear constraint;

supporting the cylindrical article from the support surface by a first pair of ball bearings that roll in the first linear constraint, the first pair of ball bearings contacting the cylindrical surface adjacent to its first end, with one ball bearing of the first pair of ball bearings on either side of a projection of the cylindrical axis onto the support surface, and a second pair of ball bearings that roll in the second linear constraint, the second pair of ball bearings contacting the cylindrical surface adjacent to its second end, with one ball bearing of the second pair of ball bearings on either side of the projection of the cylindrical axis onto the support surface; and positioning the cylindrical article by moving at least one of the ball bearings relative to the cylindrical article, the step of positioning including the steps of providing an actuator system that moves the ball bearings, providing a feedback control system comprising a sensor having as a sensor output an indication of a position of the cylindrical article, and a controller having the sensor output as an input and a command signal to the actuator system as an output, and using the actuator system to move the ball bearings responsive to the feedback control system until a desired position of the cylindrical article is achieved.

16. The method of claim 15, wherein the step of providing a cylindrical article includes the step of providing a component of an optical system as the cylindrical article.

17. The method of claim 15, wherein the step of positioning includes the step of applying a biasing force to the cylindrical article in a direction perpendicular to and toward the support surface.

18. The method of claim 15, including an additional step, after the step of positioning, of fixing the cylindrical article relative to the support surface.

19. A method for positioning a cylindrical article, comprising the steps of providing a support surface;

providing a cylindrical article having a cylindrical axis, a cylindrical surface, a first end of the cylindrical surface, and a second end of the cylindrical surface;

supporting the cylindrical article from the support surface by a first pair of ball bearings contacting the support surface and the cylindrical surface adjacent to its first end, with one ball bearing of the first pair of ball bearings on either side of a projection of the cylindrical axis onto the support surface, and second pair of ball bearings contacting the support surface and the cylindrical surface adjacent to its second end, with one ball bearing of the second pair of ball bearings on either side of the projection of the cylindrical axis onto the support surface; and positioning the cylindrical article by moving at least one of the ball bearings relative to the cylindrical article.

20. A method for positioning a cylindrical article, comprising the steps of providing a magnetized support surface;

providing a cylindrical article having a cylindrical axis, a cylindrical surface, a first end of the cylindrical surface, and a second end of the cylindrical surface;

supporting the cylindrical article from the support surface by a first pair of ferromagnetic bearings contacting the support surface and the cylindrical surface adjacent to its first end, with one bearing of the first pair of bearings on either side of a projection of the cylindrical axis onto the support surface, and a second pair of ferromagnetic bearings contacting the support surface and the cylindrical surface adjacent to its second end, with one bearing of the second pair of bearings on either side of the projection of the cylindrical axis onto the support surface; and positioning the cylindrical article by moving at least one of the bearings relative to the cylindrical article.

21. A method for positioning a cylindrical article, comprising the steps of providing a ferromagnetic support surface;

providing a cylindrical article having a cylindrical axis, a cylindrical surface, a first end of the cylindrical surface, and a second end of the cylindrical surface;

supporting the cylindrical article from the support surface by first pair of magnetized bearings contacting the support surface and the cylindrical surface adjacent to its first end, with one bearing of the first pair of bearings on either side of a projection of the cylindrical axis onto the support surface, and a second pair of magnetized bearings contacting the support surface and the cylindrical surface adjacent to its second end, with one bearing of the second pair of bearings on either side of the projection of the cylindrical axis onto the support surface; and positioning the cylindrical article by moving at least one of the bearings relative to the cylindrical article.

22. A method for positioning a cylindrical article, comprising the steps of providing a support surface;

providing a cylindrical article having a cylindrical axis, a cylindrical surface, a first end of the cylindrical surface, and a second end of the cylindrical surface;

supporting the cylindrical article from the support surface by a first pair of bearings contacting the support surface and the cylindrical surface adjacent to its first end, with one bearing of the first pair of bearings on either side of a projection of the cylindrical axis onto the support surface, and a second pair of bearings contacting the support surface and the cylindrical surface adjacent to its second end, with one bearing of the second pair of bearings on either side of the projection of the cylindrical axis onto the support surface, wherein the step of supporting includes the step of applying a force generated by an electromagnet to the cylindrical article; and positioning the cylindrical article by moving at least one of the bearings relative to the cylindrical article.

23. A method for positioning a cylindrical article, comprising the steps of providing a support surface, wherein the step of providing the support surface includes the steps of forming a first linear constraint in the support surface, and forming a second linear constraint in the support surface parallel to the first linear constraint;

providing a cylindrical article having a cylindrical axis, a cylindrical surface, a first end of the cylindrical surface, and a second end of the cylindrical surface;

supporting the cylindrical article from the support surface by a first pair of bearings contacting the support surface and the cylindrical surface adjacent to its first end, with one bearing of the first pair of bearings on either side of a projection of the cylindrical axis onto the support surface, wherein the first pair of bearings are placed into the first linear constraint, and a second pair of bearings contacting the support surface and the cylindrical surface adjacent to its second end, with one bearing of the second pair of bearings on either side of the projection of the cylindrical axis onto the support surface, wherein the second pair of bearings are placed into the second linear constraint; and positioning the cylindrical article by moving at least one of the bearings relative to the cylindrical article.

24. A method for positioning a cylindrical article, comprising the steps of providing a support surface;

providing a cylindrical article having a cylindrical axis, a cylindrical surface, a first end of the cylindrical surface, and a second end of the cylindrical surface;

supporting the cylindrical article from the support surface by a first pair of bearings contacting the support surface and the cylindrical surface adjacent to its first end, with one bearing of the first pair of bearings on either side of a projection of the cylindrical axis onto the support surface, and a second pair of bearings contacting the support surface and the cylindrical surface adjacent to its second end, with one bearing of the second pair of bearings on either side of the projection of the cylindrical axis onto the support surface; and positioning the cylindrical article by moving at least one of the bearings relative to the cylindrical article, wherein the step of positioning includes the step of applying a biasing force to the cylindrical article in a direction perpendicular to and toward the support surface.

* * * * *